United States Patent
Rozman et al.

(10) Patent No.: US 8,264,100 B2
(45) Date of Patent: Sep. 11, 2012

(54) ELECTRIC POWER GENERATING SYSTEM FOR MULTIPLE SOURCES AND INTERFACE TO AN AC GRID

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 211 days.

(21) Appl. No.: 12/557,707

(22) Filed: Sep. 11, 2009

(65) Prior Publication Data
US 2011/0062786 A1    Mar. 17, 2011

(51) Int. Cl.
*H02J 1/00* (2006.01)
*H02J 3/00* (2006.01)

(52) U.S. Cl. ............... 307/73; 307/82; 307/72; 307/66; 307/45; 363/109

(58) Field of Classification Search ............... 307/73; 363/42, 56, 98
See application file for complete search history.

(56) References Cited

U.S. PATENT DOCUMENTS

| | | | |
|---|---|---|---|
| 5,550,410 A * | 8/1996 | Titus | 290/52 |
| 6,036,508 A | 3/2000 | Anderson et al. | |
| 6,151,567 A | 11/2000 | Ames et al. | |
| 6,198,613 B1 | 3/2001 | Rozman | |
| 6,252,751 B1 | 6/2001 | Rozman | |
| 6,404,655 B1 * | 6/2002 | Welches | 363/41 |
| 6,445,451 B1 | 9/2002 | Douglas-Hamilton et al. | |
| 6,651,441 B2 | 11/2003 | Reuter et al. | |
| 6,700,803 B2 * | 3/2004 | Krein | 363/41 |
| 6,727,609 B2 | 4/2004 | Johnsen | |
| 6,757,590 B2 | 6/2004 | Ross et al. | |
| 6,804,127 B2 * | 10/2004 | Zhou | 363/37 |
| 6,882,904 B1 | 4/2005 | Petrie et al. | |
| 7,116,010 B2 | 10/2006 | Lasseter et al. | |
| 7,127,327 B1 | 10/2006 | O'Donnell et al. | |
| 7,420,378 B2 | 9/2008 | Audet et al. | |
| 7,479,749 B2 | 1/2009 | Gerding et al. | |
| 7,929,325 B2 * | 4/2011 | de Rooij et al. | 363/71 |
| 2007/0040382 A1 | 2/2007 | Towada | |
| 2007/0129110 A1 | 6/2007 | Lasseter et al. | |
| 2007/0274113 A1 * | 11/2007 | Wang et al. | 363/109 |
| 2010/0014325 A1 * | 1/2010 | Raju et al. | 363/37 |
| 2010/0237704 A1 * | 9/2010 | Nakajima et al. | 307/83 |

* cited by examiner

*Primary Examiner* — Rexford Barnie
*Assistant Examiner* — Toan Vu
(74) *Attorney, Agent, or Firm* — Carlson, Gaskey & Olds, PC

(57) ABSTRACT

An electric power generating system includes a plurality of variable power sources including at least one source of DC power and at least one source of AC power. Converters convert power supplied by the plurality of power sources to a common source of power to be communicated to a collector bus. A power grid supplies three-phase power to components requiring three-phase power downstream of the collector bus. Converters provide three phases of power to the power bus from the collector bus.

11 Claims, 8 Drawing Sheets

ELECTRIC POWER GENERATING SYSTEM FOR MULTIPLE SOURCES AND INTERFACE TO AN AC GRID

BACKGROUND OF THE INVENTION

This application relates to an electric power generating system wherein multiple sources communicate through a collector bus to an AC grid.

Electric power supply systems are becoming more and more complex. Traditionally, there were only a few power sources, and those power sources tended to be of similar type.

However, modern vehicles are often provided with a high number of very distinct power sources. It becomes challenging to collect all of the power generated across the several sources, and then utilized that power intelligently to provide power to loads associated with the vehicle.

SUMMARY OF THE INVENTION

An electric power generating system includes a plurality of variable power sources including at least one source of DC power and at least one source of AC power. Converters convert power supplied by the plurality of power sources to a common source of power to be communicated to a collector bus. A power grid supplies three-phase power to components requiring three-phase power downstream of the collector bus. Converters provide three phases of power to the power bus from the collector bus.

These and other features of the present invention can be best understood from the following specification and drawings, the following of which is a brief description.

DETAILED DESCRIPTION OF THE PREFERRED EMBODIMENT

Figure 1:
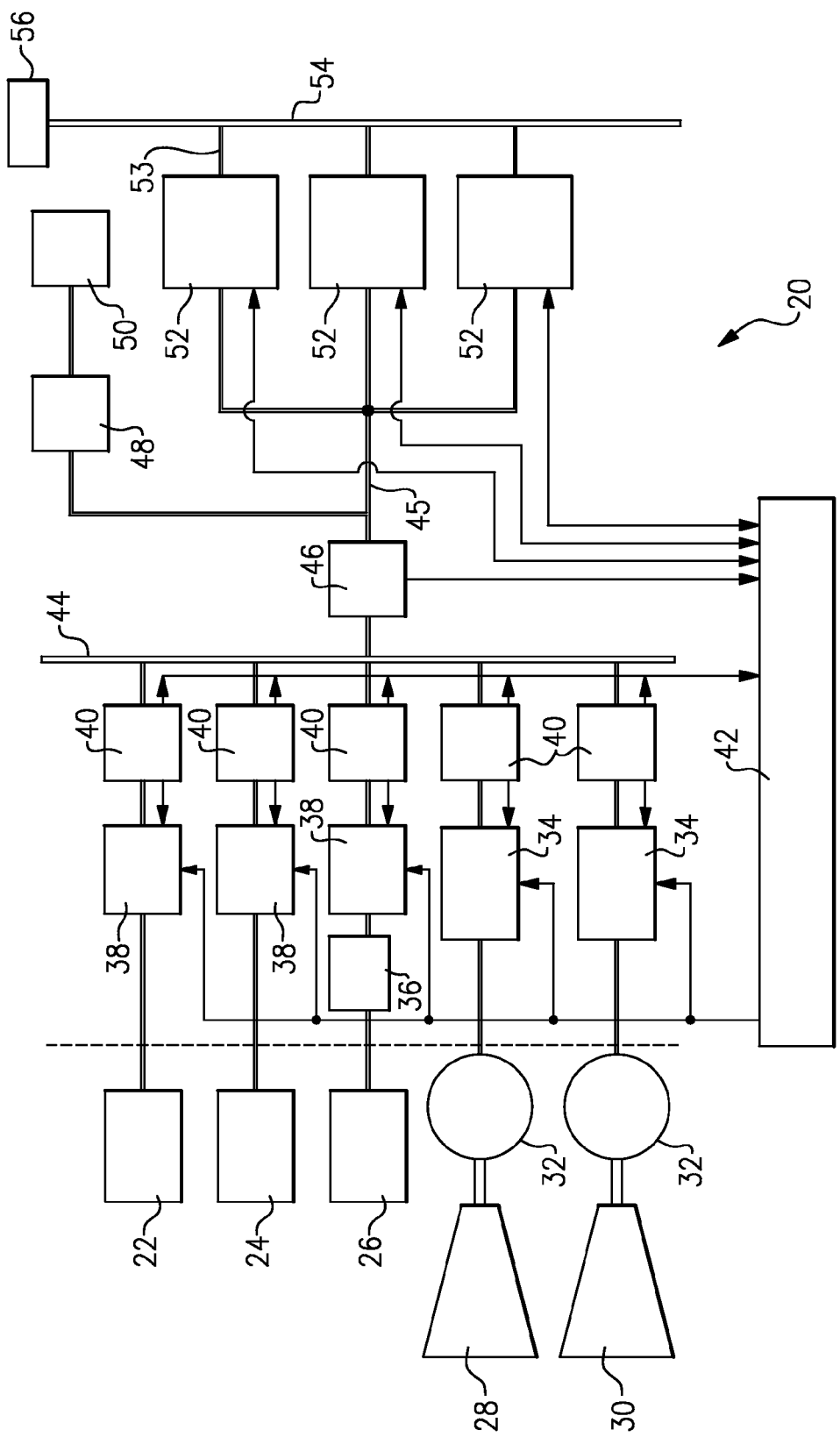
FIG. 1 shows a first electric power generating system type.

FIG. 1 shows an electric power generating system for combining power generated by a plurality of sources 22, 24, 26, 28 and 30. As an example, source 22 could be a fuel cell, source 24 could be an energy storage device such as a super capacitor or a battery, and source 26 could be photovoltaic elements. Source 28 could be a gas turbine engine associated with a generator 32, while source 30 could be an IC engine associated with its own generator 32. Downstream of the generators 32, AC to DC converters 34 convert the supplied power. A maximum point power tracking device 36 is positioned downstream of the photovoltaic elements 26.

DC to DC converters 38 are associated with the full cell 22, the energy storage device 24, and the photovoltaic elements 26. Voltage and current sensors 40 are associated with all of the converters 34 and 38. All of the sources then transmit the several generated power to a collector bus 44. In FIG. 1, the collector bus 44 is a DC bus, and may operate at 750 volts, as an example.

Downstream of the collector bus 44 is another set of voltage and current sensors 46. A DC link inverter 48 is tapped off of a line 45 downstream of the collector bus 44 and supplies DC power to motor driven loads 50. Examples of the motor driven loads are the compressor associated with a refrigerant system, the fuel pump, the oil pump, etc.

A plurality of DC to DC convertors with modulation 52 take in the DC power from the collector bus 44, and change that power into each of three phases supplied through a line 53 to a three-phase power grid 54. The three-phase power grid 54 supplies power to components 56, which may be standard equipment requiring three-phase alternating current, such as communication equipment.

As disclosed in FIG. 1, the overall system is operable to take in multiple sources, and efficiently use the several distinct types of power generated by the sources.

An energy management controller 42 operates to control the provision of the power by the several converters.

Figure 2:
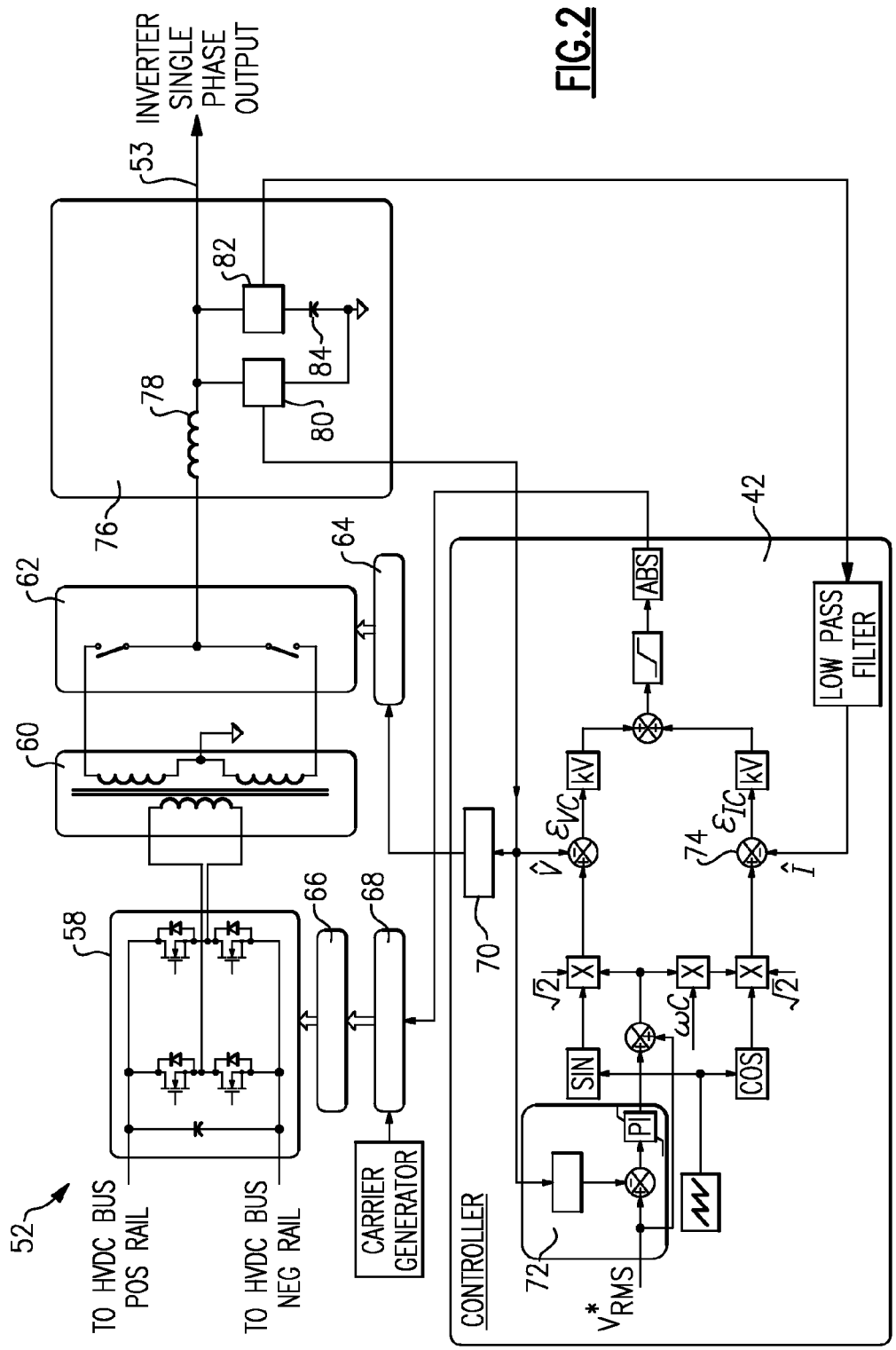
FIG. 2 shows a detail of the FIG. 1 system.

FIG. 2 shows an example of the converters 52. As shown, the high frequency converter 58 is associated with the high frequency transformer 60, and a single pole bi-directional switch 62. The switch 62 and the converter 58 are each controlled by gate drivers 64 and 66 which are ultimately powered by the controller 42. An output filter 76 is downstream of the switch 62 and includes an output inductor 78. A voltage sensor 80 senses the voltage on the inductor 78, and a current sensor 82 is associated with an output capacitor 84. This voltage and current are provided as feedback to the controller 42. The controller 42 modulates the converter 58 via modulator 68 to achieve a high frequency signal modulated by sinusoidal half wave double output frequency signal on the input terminals of a bidirectional switch 62. Zero cross detector 70 controls the bidirectional switch 62 in response to the output voltage polarity, resulting in restoring modulation half wave sinusoidal waveform to fundamental sinusoidal at the input of output filter 76. Output filter 76 rejects the high frequency component providing good quality single phase output. A trimming loop 72 is responsive to rms voltage.

Figure 3:
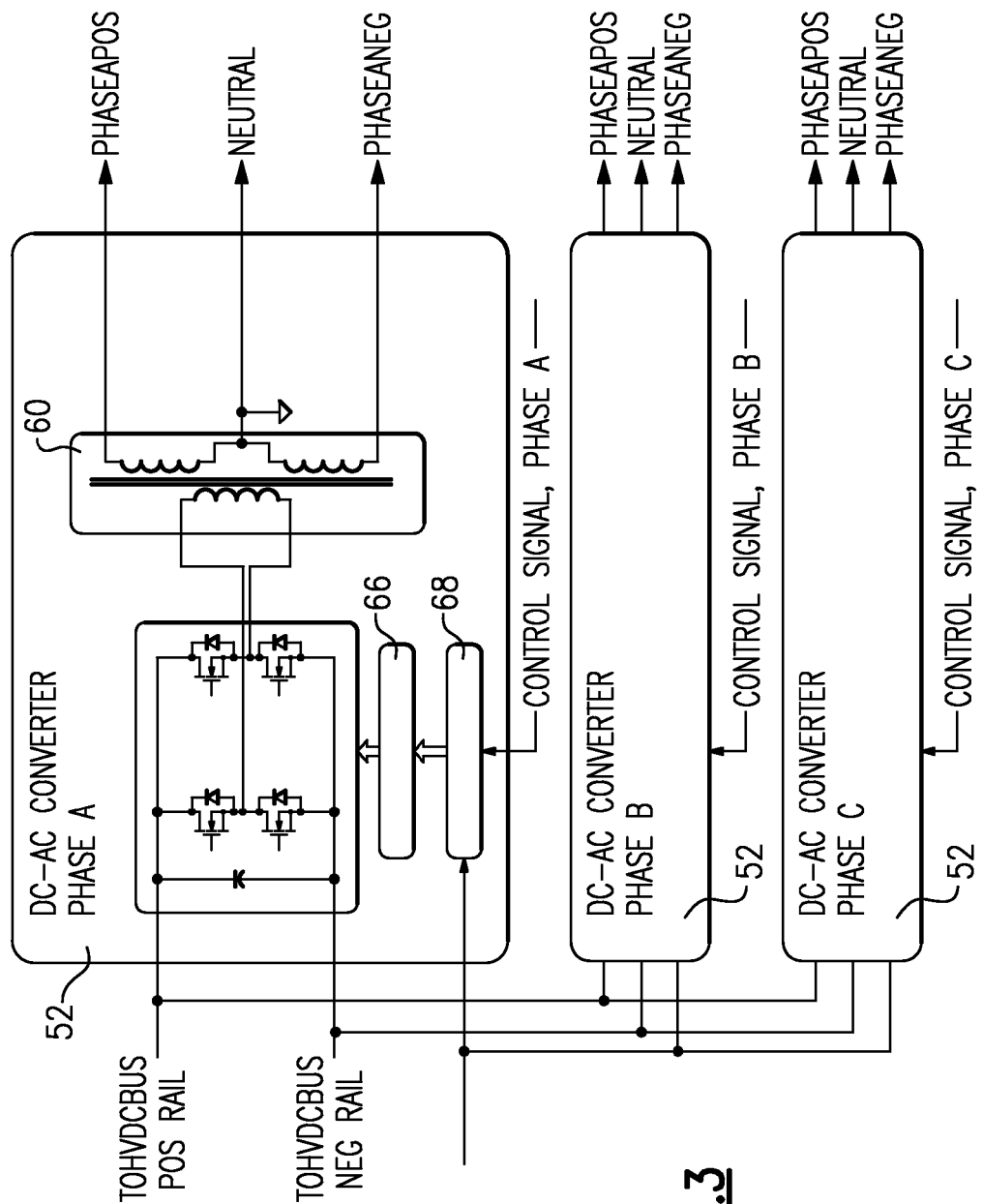
FIG. 3 shows another detail of the FIG. 1 system.

To achieve a three-phase output, three single phase converters 52 are used. In this case controller 42 modulation signals are shifted by 120 electrical degrees within individual converter 52. As shown in FIG. 3, the controller 42 operates to separately control each of the three converters 52. Again, the overall system is thus able to efficiently take in several distinct types of generated power and efficiently provide fine control to the overall system 20.

Figure 4:
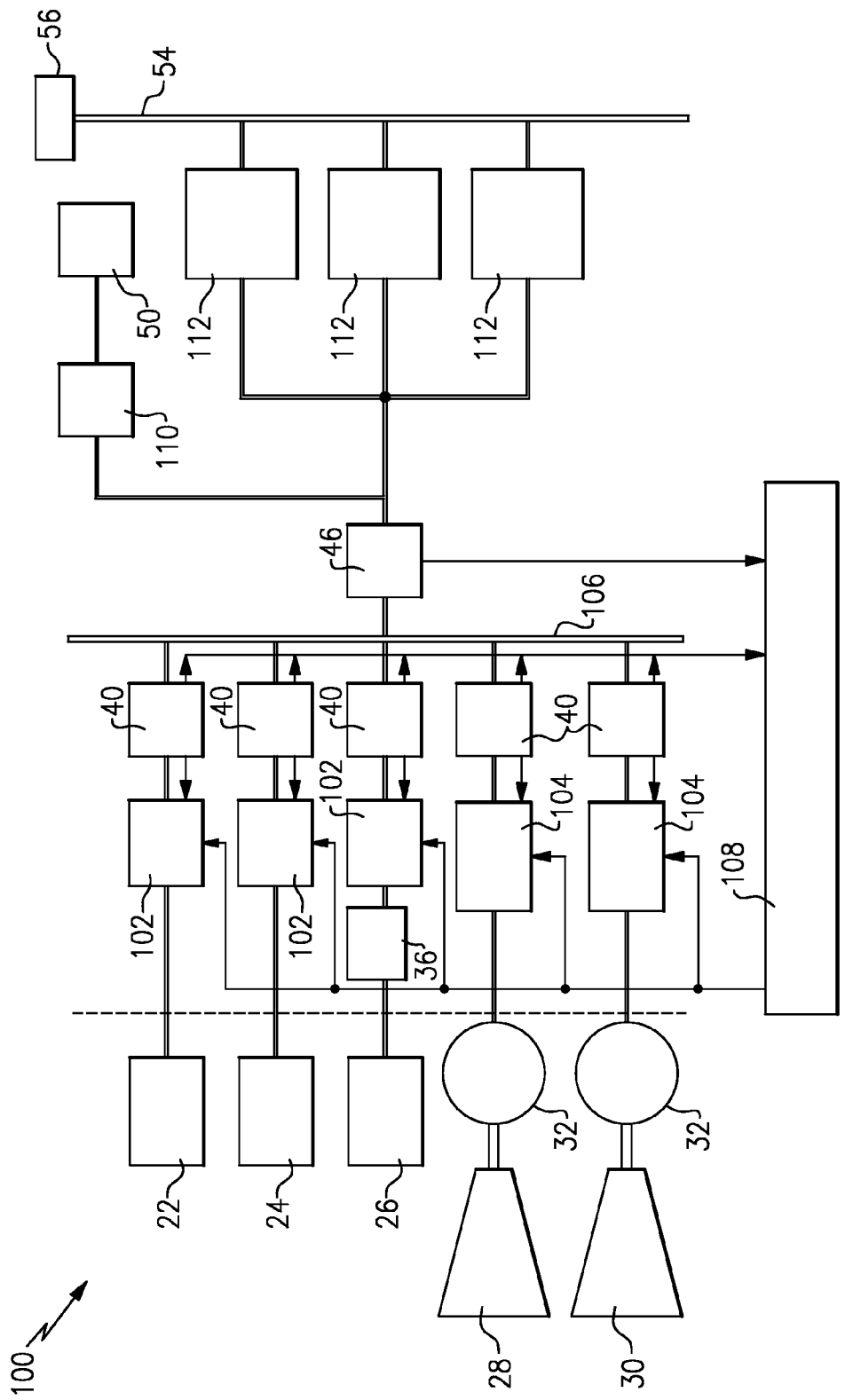
FIG. 4 shows a second embodiment power generating system.

FIG. 4 shows another electric power generating system 100. Again, a plurality of distinct sources 22, 24, 26, 28 and 30 may supply both AC and DC power toward a collector bus 106. However, collector bus 106 as shown in this system is a high frequency single phase constant voltage bus. Now, the converters 102 are DC to AC converters. The converters 104 are AC-DC-AC converters. Thus, at the collector bus 106 there is a single phase constant voltage. Cycloconverters 110 convert the high frequency to a low frequency AC current to be utilized by the motor driven loads 50. A plurality of single phase cycloconverters 112 take in the single phase constant voltage, and create three-phase power for the grid 54. Again, an energy management controller 108 is utilized to control the inverters or cycloconverters.

Figure 5:
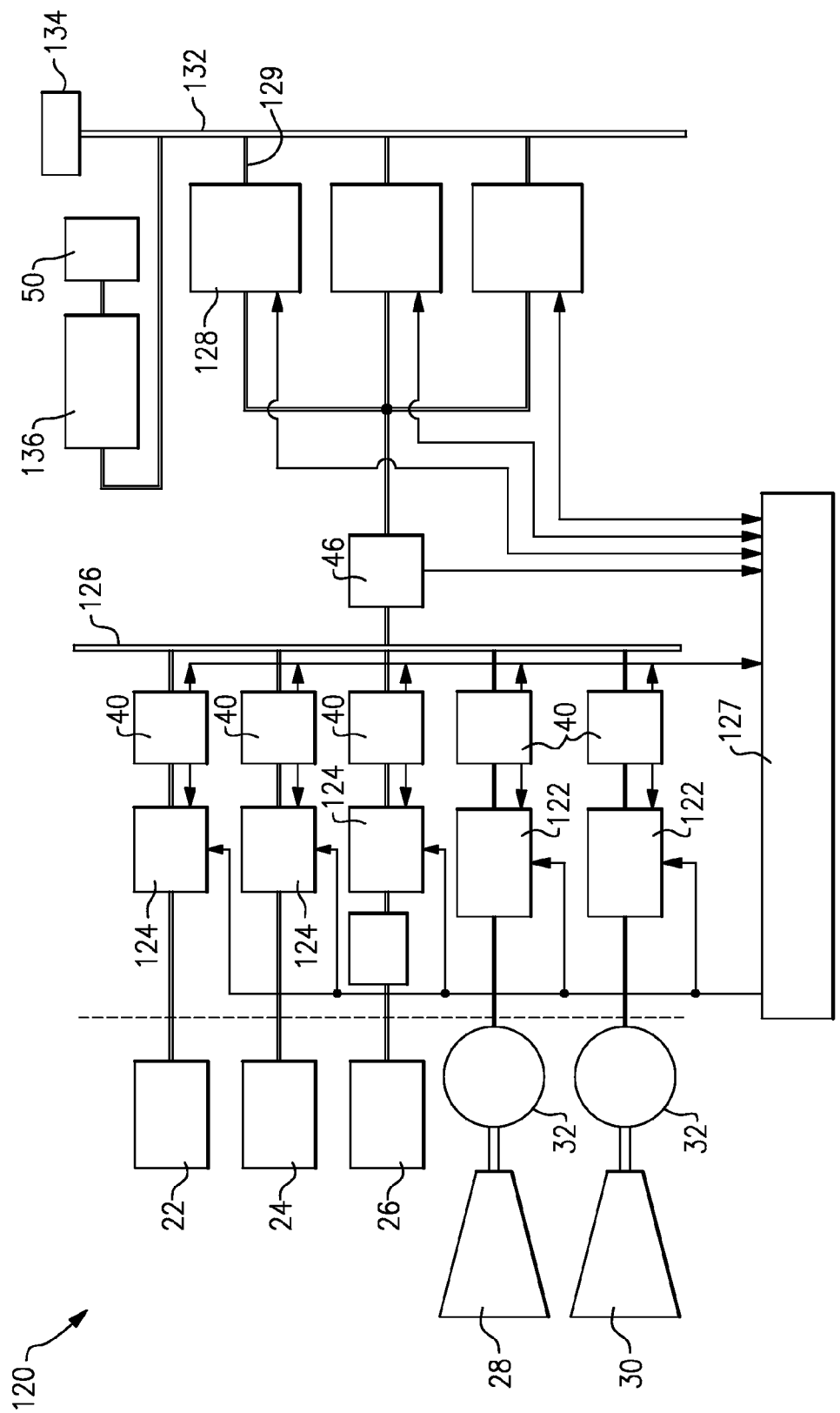
FIG. 5 shows another embodiment of an electric power generating system.

FIG. 5 shows yet another system 120. In system 120, the collector bus 126 is a three-phase bus with 50/60 Hz modulation. Now, the converters 122 are AC-DC-AC converters with modulation. Converters 124 are DC to AC converters with modulation. The modulation may be as known to convert the supply power into three phases to be collected at the collector bus 126. Downstream of the collector bus 126 are single phase reduced component inverters 128 which communicate through lines 130 to an energy management controller 127. Lines 129 connect each of the inverters 128 to the three-phase power grid 132, and supply power to components 134. An AC-DC-AC motor drive inverter 136 provides power to the motor driven modes from the grid 132.

Figure 6:
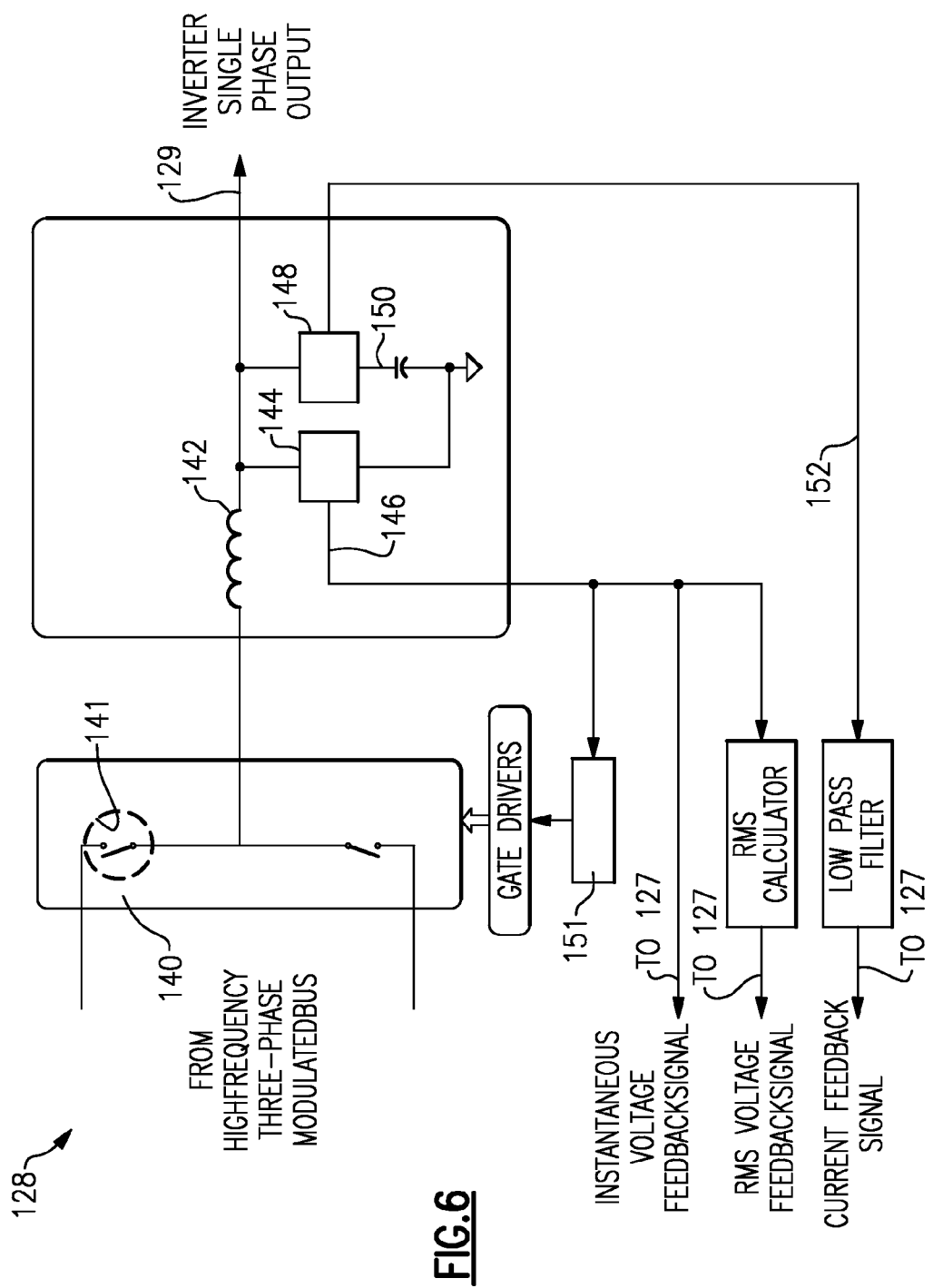
FIG. 6 shows a detail of the FIG. 5 system.

As shown in FIG. 6, each of the reduced component set inverters 128 include a single pole bi-directional switch 140. The switch 140 is shown in simplified form in the figure, and includes a switching element 141 which is better described in FIGS. 8a-8c. An output-input inductor 142 is associated with a voltage sensor 144 communicating through a line 146 with the controller 127, and with a zero cross detector 151. In addition, a current sensor 148 is associated with an output capacitor 150. A line 152 communicates the current sensor 148 to the controller 127.

Figure 7:
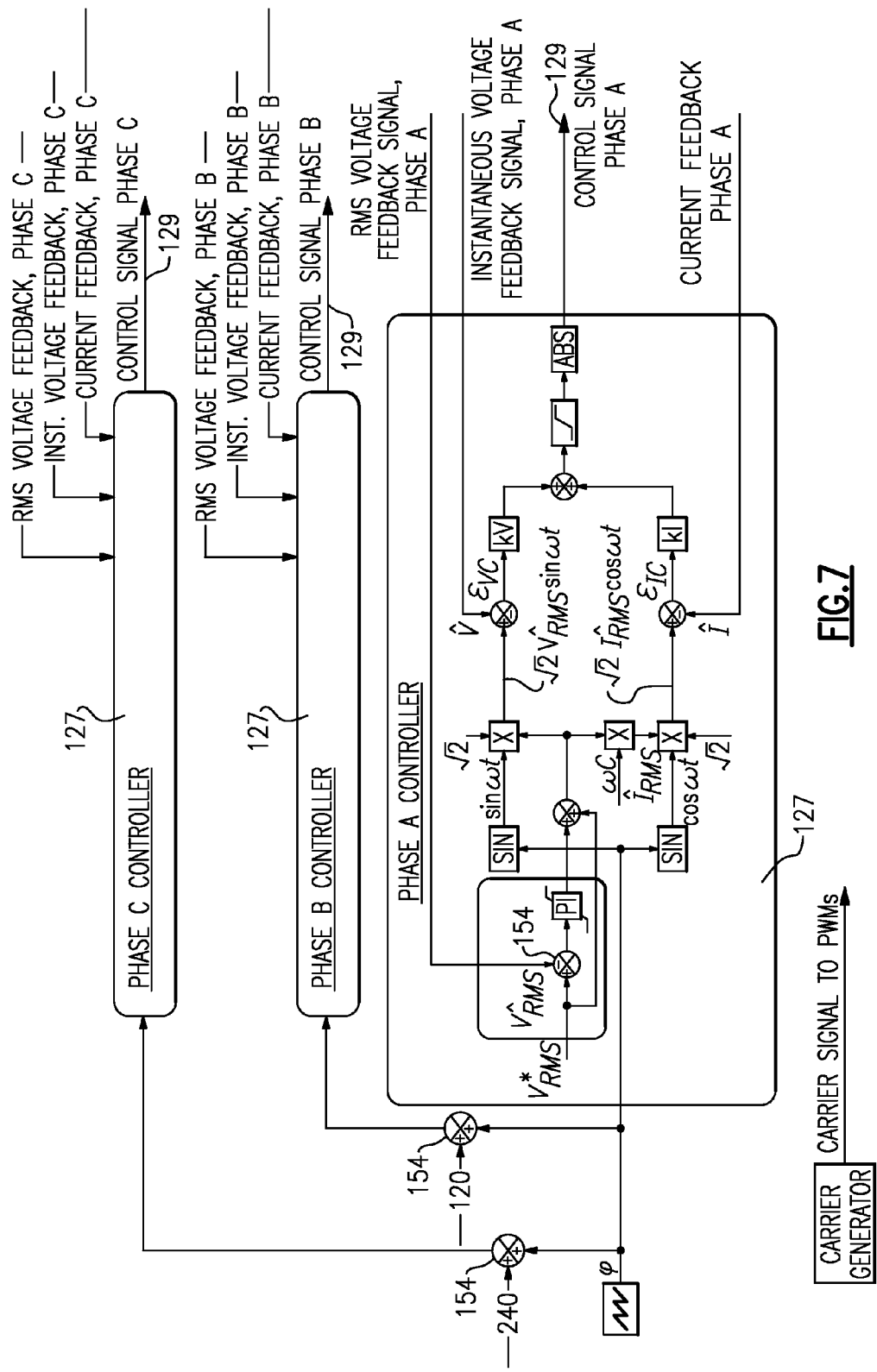
FIG. 7 shows another detail of the FIG. 5 system.

As shown in FIG. 7, summing circuits 154 control the three inverters 128 such that three phases of power are supplied on lines 129 to the power grid. Again, the detail of the controller may be generally as is known.

Figure 8A:
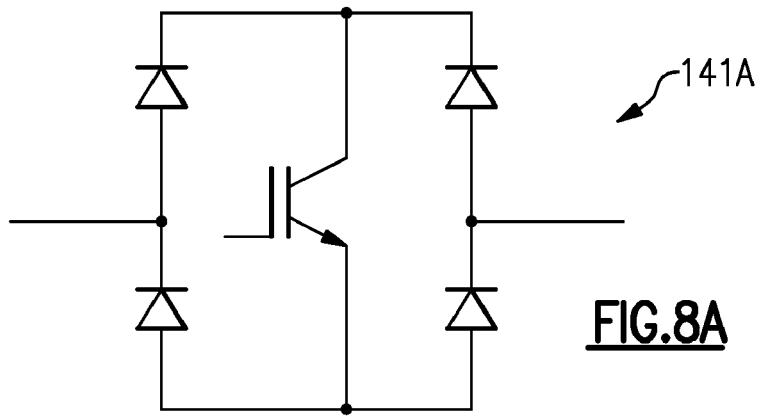
FIG. 8a shows a first embodiment of a portion of the FIG. 5 system.
Figure 8B:
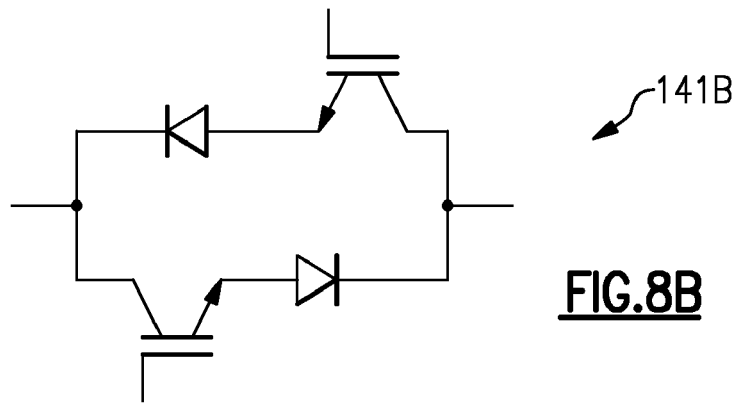
FIG. 8b shows yet another embodiment.
Figure 8C:
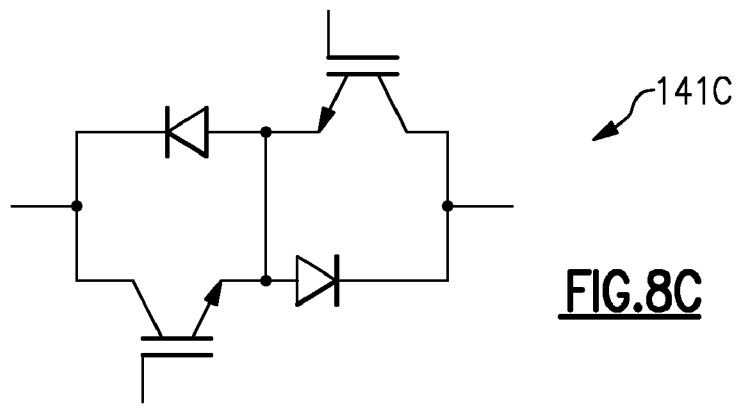
FIG. 8c shows yet another embodiment.

FIG. 8a shows a first embodiment 141a of the switch element shown at 141 in FIG. 6. FIG. 8b shows a second embodiment 141b. FIG. 8c shows another embodiment 141c of the switch. Similar switches can be utilized as the bi-directional switch 62 in FIG. 2.

Overall, the several disclosed systems take in a variety of distinct types of power and provide power to components through an efficient and easily controlled architecture. A worker of ordinary skill in this art would recognize that modifications would come within the scope of this invention. For that reason, the following claims should be studied to determine the true scope and content of this invention

What is claimed is:

1. An electric power generating system comprising:
    a plurality of variable power sources including at least one source of DC power and at least one source of AC power;
    upstream converters for converting power supplied by said plurality of power sources to a common source of power communicated to a common collector bus;
    a power grid for supplying three-phase power to components requiring three-phase power, and downstream on said common collector bus;
    downstream converters for providing said three phases of power to said power grid from said common collector bus;
    said common collector bus being a high voltage DC bus;
    a DC link inverter being positioned intermediate said common collector bus and said downstream converters, and said DC link inverter providing power to motor driven loads;
    said downstream converters being DC to AC converters with modulation to change DC power from said common collector bus to a phase of AC power for delivery to said three-phase power grid; and
    said converters including a high frequency converter, a transformer, and a single pole bi-directional switch, and there are at least 3 of said converters to provide 3 phases of AC power.

2. The system as set forth in claim 1, wherein said multiple power sources include a fuel cell, energy storage elements, and photovoltaic elements as said sources for supplying DC power.

3. The system as set forth in claim 2, wherein said multiple power sources include at least one of a gas turbine engine and an internal combustion engine communicating with a generator to provide said at least one source of AC power.

4. The system as set forth in claim 1, wherein said multiple power sources include at least one of a gas turbine engine and an internal combustion engine communicating with a generator to provide said at least one source of AC power.

5. An electric power generating system comprising:
    a plurality of variable power sources including at least one source of DC power and at least one source of AC power;
    upstream converters for converting power supplied by said plurality of power sources to a common source of power communicated to a common collector bus;
    a power grid for supplying three-phase power to components requiring three-phase power, and downstream on said common collector bus;
    downstream converters for providing said three phases of power to said power grid from said common collector bus; and
    said common collector bus including a high frequency single phase constant voltage bus.

6. The system as set forth in claim 5, wherein cycloconverters communicate power from said common collector bus to motor driven loads.

7. The system as set forth in claim 6, wherein the three-phase power delivered to the said power grid are created by single phase cycloconverters.

8. An electric power generating system comprising:
    a plurality of variable power sources including at least one source of DC power and at least one source of AC power;
    upstream converters for converting power supplied by said plurality of power sources to a common source of power communicated to a common collector bus;
    a power grid for supplying three-phase power to components requiring three-phase power, and downstream on said common collector bus;
    downstream converters for providing said three phases of power to said power grid from said common collector bus; and
    said common collector bus is a high frequency three-phase common collector bus modulated by half wave sinusoidal waveform with the frequency equal to twice the power grid frequency.

9. The system as set forth in claim 8, wherein said downstream converters are single phase reduced component set inverters.

10. The system as set forth in claim 9, wherein said single phase reduced component set inverters include a single pole bi-directional switch.

11. The system as set forth in claim 8, wherein a plurality of motor driven loads are supplied with power through an AC-DC-AC motor drive inverter from said power grid.

* * * * *